(12) United States Patent
Kaneko

(10) Patent No.: US 8,950,370 B2
(45) Date of Patent: Feb. 10, 2015

(54) VALVE TIMING CONTROL APPARATUS

(75) Inventor: Masaaki Kaneko, Nukata-gun (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 896 days.

(21) Appl. No.: 13/051,008

(22) Filed: Mar. 18, 2011

(65) Prior Publication Data

US 2011/0271919 A1   Nov. 10, 2011

(30) Foreign Application Priority Data

May 7, 2010 (JP) .................. 2010-107613

(51) Int. Cl.
*F01L 1/34* (2006.01)
*F01L 1/344* (2006.01)
*F02D 13/02* (2006.01)

(52) U.S. Cl.
CPC ........... *F01L 1/3442* (2013.01); *F02D 13/0219* (2013.01); *F01L 2001/34463* (2013.01); *F01L 2001/34466* (2013.01); *F01L 2001/34473* (2013.01); *F01L 2800/03* (2013.01); *Y02T 10/142* (2013.01); *Y02T 10/18* (2013.01)
USPC ..................... 123/90.17; 123/90.15

(58) Field of Classification Search
CPC .................... F01L 1/3442; F01L 1/344; F01L 2001/34466; F01L 2001/34453; F01L 2001/3443; F01L 2001/34463; F01L 2800/03; F01L 2001/34456
USPC ................. 701/114; 123/90.17, 90.15, 90.16, 123/90.31; 74/568 R; 464/1, 160
See application file for complete search history.

(56) References Cited

U.S. PATENT DOCUMENTS 6,505,586 B1 *  1/2003  Sato et al. .................. 123/90.17
7,018,321 B2 *  3/2006  Claar et al. ...................... 477/92

(Continued)

FOREIGN PATENT DOCUMENTS

EP   1 375 838 A2   1/2004
EP   1 538 308 A1   6/2005

(Continued)

OTHER PUBLICATIONS

European Search Report issued by the European Patent Office on Oct. 25, 2011 in European Application No. 11158832.

*Primary Examiner* — Mahmoud Gimie
*Assistant Examiner* — David Hamaoui
(74) *Attorney, Agent, or Firm* — Buchanan Ingersoll & Rooney PC

(57) ABSTRACT

A valve timing control apparatus includes a driving-side rotating member, a driven-side rotating member, a fluid pressure chamber formed by the driving-side rotating member and the driven-side rotating member and divided into a retarded angle chamber and an advanced angle chamber by a parting portion, a fluid control valve mechanism controlling a supply and a discharge of an operation fluid to and from the fluid pressure chamber, a lock mechanism locking a relative rotational phase of the driven-side rotating member relative to the driving-side rotating member at a predetermined phase, a monitoring mechanism monitoring a driving state of an internal combustion engine, and a phase setting mechanism controlling the fluid control valve mechanism so as to establish the predetermined phase in a case where the monitoring mechanism detects a signal indicating a likelihood of a decrease of a number of rotations of the internal combustion engine exceeding a control range.

14 Claims, 8 Drawing Sheets

(56) References Cited

U.S. PATENT DOCUMENTS

| | | | |
|---|---|---|---|
| 8,267,058 B2 * | 9/2012 | Suzuki et al. | 123/90.17 |
| 8,464,672 B2 * | 6/2013 | Takemura et al. | 123/90.15 |
| 2002/0100445 A1 | 8/2002 | Takenaka et al. | |
| 2003/0121486 A1 * | 7/2003 | Komazawa et al. | 123/90.17 |
| 2003/0188704 A1 | 10/2003 | Aimone | |
| 2005/0257762 A1 | 11/2005 | Sawada | |
| 2006/0075983 A1 * | 4/2006 | Schmitt | 123/90.17 |
| 2011/0162606 A1 * | 7/2011 | Kaneko | 123/90.17 |
| 2011/0232595 A1 * | 9/2011 | Kokubo et al. | 123/90.17 |

FOREIGN PATENT DOCUMENTS

| | | |
|---|---|---|
| EP | 2 154 338 A1 | 2/2010 |
| EP | 2 161 418 A1 | 3/2010 |
| JP | 2002-256912 A | 9/2002 |

* cited by examiner

VALVE TIMING CONTROL APPARATUS

CROSS REFERENCE TO RELATED APPLICATIONS

This application is based on and claims priority under 35 U.S.C. §119 to Japanese Patent Application 2010-107613, filed on May 7, 2010, the entire content of which is incorporated herein by reference.

TECHNICAL FIELD

This disclosure relates to a valve timing control apparatus.

BACKGROUND DISCUSSION

Generally, when blowout, run out of fuel and the like occurs because of a malfunction of components configuring an internal combustion engine, such as an injector, a fuel pump, an ignition coil, an ignition plug and the like, a deterioration in drivability, a malfunction of a control system and the like, a decrease of number of rotations (i.e. rotational speed) of the internal combustion engine exceeding a control range thereof, in other words, a recoverable decrease of the number of rotations of the internal combustion engine (i.e. an engine stall) may be caused. Furthermore, when a driver suddenly and deeply depresses a brake pedal while a vehicle travels on a low friction road, tires may slip, which may cause a lock of the tires. As a result, the number of rotations of the internal combustion engine may rapidly decrease, which may further result in causing the engine stall.

A valve timing control apparatus disclosed in JP2002-256912A is configured so as to execute a control in view of an engine stall. The valve timing control apparatus disclosed in JP2002-256912A includes a first detecting means, a second detecting means and a determining means. The first detecting means detects a deviation between an actual number of rotations (i.e. an actual engine speed) of an internal combustion engine and a reference number of rotations (i.e. a reference engine speed) of the internal combustion engine. The second detecting means detects a changing rate of the actual number of rotations of the internal combustion engine (i.e. changes in the actual number of rotations of the internal combustion engine). The determining means determines a chance of the engine stall of the internal combustion engine to happen on the basis of detection results of the first and second detecting means. Then, the valve timing control apparatus disclosed in JP2002-256912A is controlled on the basis of a determination result of the determining means.

The valve timing control apparatus disclosed in JP2002-256912A further includes a lock mechanism, which corresponds to first and second lock portions, for locking a relative rotational phase at a predetermined phase (i.e. an intermediate phase) between a most retarded angle phase and a most advanced angle phase. The predetermined phase is set as a phase corresponding to an opening/closing timing of an intake valve by which a startability of the internal combustion engine is improved.

The determining means determines that "the engine stall is unavoidable" in a case where a decrease of the number of rotations of the internal combustion engine is rapid. On the other hand, in a case where the decrease of the number of rotations of the internal combustion engine is small or in a case where the decrease of the number of rotations of the internal combustion engine is not detected, the determining means determines that "the engine stall is not likely to occur". Furthermore, in a case where the determining means determines that the engine stall is avoidable even if the decrease of the number of rotations of the internal combustion engine is detected, the determining means concludes that "the engine stall is avoidable".

Then, in the case where the determining means determines that the "engine stall is not likely to occur", more specifically, in a case where a determination index such as the deviation of the number of rotations and the like falls within a first area, a normal control is executed to the valve timing control apparatus. In the case where the determining means determines that "the engine stall is avoidable", more specifically, in a case where the determination index such as the deviation of the number of rotations and the like falls within a second area, the relative rotational phase established by the valve timing control apparatus provided at the intake valve is shifted to a retarded angle phase relative to the predetermined phase in order to reduce an overlap between a valve opening timing of the intake valve and a valve opening timing of an exhaust valve, or in order to eliminate the overlap between the valve opening timing of the intake valve and the valve opening timing of the exhaust valve. Accordingly, combustibility of the internal combustion engine may be increased, which may result in avoiding the engine stall. Still further, in the case where the determining means determines that "the engine stall is unavoidable", more specifically, in a case where the determination index such as the deviation of the number of rotations and the like falls within a third area, the relative rotational phase is set as the predetermined phase in order to prepare for an appropriate restart of the internal combustion engine.

In sum, the valve timing control apparatus disclosed in JP2002-256912A executes different controls of the relative rotational phase depending on the number of rotations of the internal combustion engine in order to avoid the engine stall or in order to prepare for the appropriate restart of the internal combustion engine after the engine stall occurs.

There exists a valve timing control apparatus of an intake valve, which is configured so that a phase area is set at a predetermined range from a most retarded angle phase to an advanced angle phase so that an internal combustion engine is not startable, in other words, an area of the Atkinson cycle (which will be hereinafter referred to as an Atkinson area) is set in a predetermined range from the most retarded angle phase to the advanced angle phase. In a case where a driving state of the internal combustion engine is in a middle-to-low load area where a throttle opening degree is small, e.g. in a case where the internal combustion engine is in an idle state and the like, a relative rotational phase is set so as to fall within the Atkinson area. According to the known valve timing control apparatus including the Atkinson area, an explosive expanding operation becomes greater than a compression operation, so that a relatively great work may be obtained with a relatively small amount of air and fuel. As a result, a pumping loss may be reduced, so that fuel consumption is improved.

However, because the valve timing control apparatus disclosed in JP2002-256912A is configured so as to determine the chance of the engine stall to happen on the basis of the decrease of the number of rotations of the internal combustion engine, in other words, because the valve timing control apparatus disclosed in JP2002-256912A is configured so as to execute a phase control when the number of rotations of the internal combustion engine starts decreasing, a discharge pressure of a pump is already decreased at a point of time specifically when the determining means determines that "the engine stall is unavoidable", so that the relative rotational phase may not be shifted to the predetermined phase. As a result, for example, the internal combustion engine may be stopped while the relative rotational phase forms a phase closer to the advanced angle phase relative to the predetermined phase.

Furthermore, the determining means is configured so as to determine that the "the engine stall is unavoidable" in the case where the determination index of the deviation of the number of rotations of the internal combustion engine and the like falls within the third area. The second area is set between the first area, within which the determination index is found while the vehicle is normally driven, and the third area. Therefore, in the case where the rapid decrease of the number of rotations of the internal combustion engine occurs while the relative rotational phase establishes the phase closer to the retarded angle phase relative to the predetermined phase, a retarded angle control is once executed while the determination index is within the second area, although an advanced angle control needs to be executed in order to shift the relative rotational phase to correspond to the predetermined phase. Therefore, an advanced angle control amount to be applied while the determination index is within the third area becomes great, so that the relative rotational phase may not be shifted towards the predetermined phase. As a result, the internal combustion engine may be stopped while the relative rotational phase establishes the phase closer to the retarded angle phase relative to the predetermined phase.

The valve timing control apparatus disclosed in JP2002-256912A does not use the Atkinson are, therefore, even if the internal combustion engine is stopped while the relative rotational phase establishes the phase closer to the retarded angle phase relative to the predetermined phase, the internal combustion engine may be restarted. However, according to the known valve timing control apparatus using the Atkinson area, the internal combustion engine may not be appropriately restarted while the relative rotational phase establishes the phase closer to the retarded angle phase relative to the predetermined phase.

A need thus exists for a valve timing control apparatus which is not susceptible to the drawback mentioned above.

SUMMARY

According to an aspect of this disclosure, a valve timing control apparatus includes a driving-side rotating member synchronously rotated relative to a crankshaft of an internal combustion engine, a driven-side rotating member arranged in a coaxial manner relative to the driving-side rotating member and synchronously rotated relative to a camshaft for opening and closing a valve of the internal combustion engine, a fluid pressure chamber formed by the driving-side rotating member and the driven-side rotating member and divided into a retarded angle chamber and an advanced angle chamber by means of a parting portion, which is provided at least one of the driving-side rotating member and the driven-side rotating member, a fluid control valve mechanism controlling a supply of an operation fluid discharged from a pump, which is configured to be actuated in response to a rotation of the internal combustion engine, to the fluid pressure chamber and a discharge of the operation fluid from the fluid pressure chamber, a lock mechanism configured so as to lock a relative rotational phase of the driven-side rotating member relative to the driving-side rotating member at a predetermined phase, which is set as a phase falling within an advanced angle phase relative to a phase range in the most retarded angle phase not suitable to restart the internal combustion engine, a monitoring mechanism monitoring a driving state of the internal combustion engine, and a phase setting mechanism controlling the fluid control valve mechanism so that the relative rotational phase establishes the predetermined phase in a case where the monitoring mechanism detects a signal indicating a likelihood of a decrease of a number of rotations of the internal combustion engine exceeding a control range.

According to another aspect of this disclosure, a valve timing control apparatus includes a driving-side rotating member synchronously rotated relative to a crankshaft of an internal combustion engine, a driven-side rotating member arranged in a coaxial manner relative to the driving-side rotating member and synchronously rotated relative to a camshaft for opening and closing a valve of the internal combustion engine, a fluid pressure chamber formed by the driving-side rotating member and the driven-side rotating member and divided into a retarded angle chamber and an advanced angle chamber by means of a parting portion, which is provided at least one of the driving-side rotating member and the driven-side rotating member, a fluid control valve mechanism controlling a supply of an operation fluid discharged from a pump to the fluid pressure chamber and a discharge of the operation fluid from the fluid pressure chamber, a lock mechanism configured so as to lock a relative rotational phase of the driven-side rotating member relative to the driving-side rotating member at a predetermined phase between a most retarded angle phase and a most advanced angle phase, a monitoring mechanism monitoring a driving state of the internal combustion engine, and a phase setting mechanism controlling the fluid control valve mechanism so that the relative rotational phase establishes the predetermined phase in a case where the monitoring mechanism detects a signal indicating a likelihood of a decrease of a number of rotations of the internal combustion engine.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a valve timing control apparatus, which is provided at an intake valve of an engine E for a vehicle, will be described below with reference to FIGS. 1 to 8 of the attached drawings. The engine E for the vehicle serves as an internal combustion engine.

[Overview]

Figure 1:
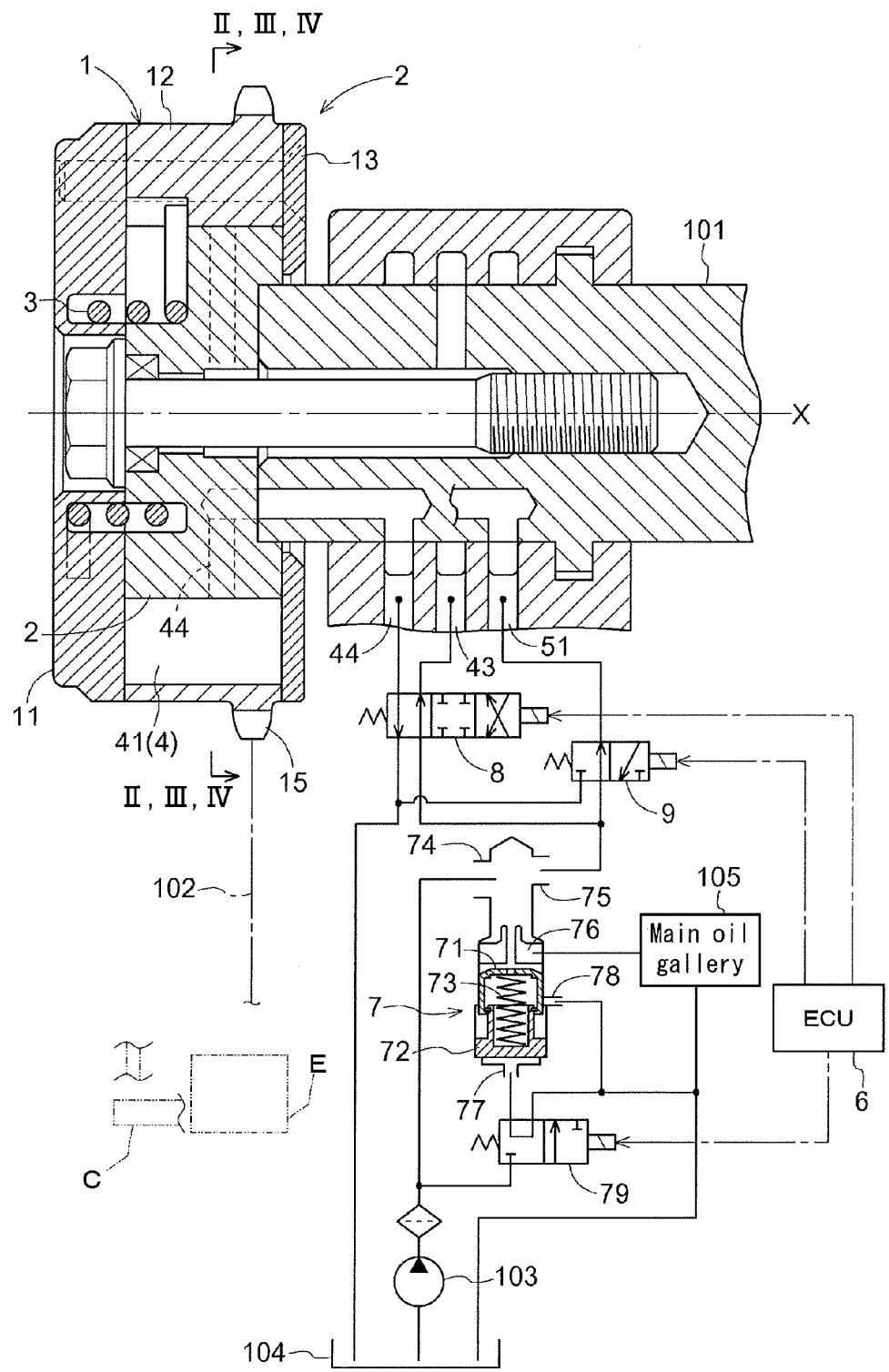
FIG. 1 is cross-sectional diagram illustrating a configuration of a valve timing control apparatus according to an embodiment.

As illustrated in FIG. 1, the valve timing control apparatus includes a housing 1 and an inner rotor 2. The housing 1 synchronously rotates relative to a crankshaft C of the engine E. Furthermore, the housing 1 serves as a driving-side rotating member. The inner rotor 2 is arranged in a coaxial manner relative to the housing 1 and synchronously rotates with a camshaft 101. Furthermore, the inner rotor 2 serves as a driven-side rotating member. A fluid pressure chamber 4 (in this embodiment, three fluid chambers 4) is defined by the housing 1 and the inner rotor 2. The valve timing control apparatus further includes an oil control valve (OCV) 8, which serves as a fluid control valve mechanism. A relative rotational phase is shifted in a manner where supply and discharge of an operation fluid, which is discharged from a pump 103, relative to the fluid pressure chambers 4 is controlled in response to a control executed to the OCV 8.

The valve timing control apparatus further includes a lock mechanism 5. The lock mechanism 5 is configured to lock a relative rotational movement of the inner rotor 2 relative to the housing 1 in order to lock the relative rotational phase of the inner rotor 2 relative to the housing 1 at an intermediate lock phase, which serves as a predetermined phase. The intermediate lock phase is set as a phase between a most retarded angle phase and a most advanced angle phase and as the phase closer to an advanced angle relative to a "phase range at the most retarded angle phase not suitable for restarting the engine E". The "phase range at the most retarded angle phase not suitable for restarting the engine E" refers to a phase range from the phase, which is set between the most retarded angle phase and the most advanced angle phase, to the most retarded angle phase, in other words, an Atkinson area. The lock mechanism 5 is configured so as to be actuated in a manner where the operation fluid discharged from the pump 103 acts on the lock mechanism 5 in response to a control executed by an oil switching valve (OSV) 9.

Generally, in a case where a driving state of the engine E is in a middle-to-low load area where a throttle opening degree is small, e.g. in a case where the engine E is in an idle state and the like, an explosive expanding operation becomes greater than a compressing operation by setting the relative rotational phase to correspond to the Atkinson area. As a result, a great work may be obtained with relatively small amount of air and fuel, which may further result in reducing a pumping loss. Accordingly, fuel consumption may be improved. However, in the case where the relative rotational phase falls within the Atkinson area, the engine E may not be smoothly started. Therefore, a control needs to be executed by the lock mechanism 5 in order to lock the relative rotational phase at the intermediate lock phase when the engine E is stopped.

The pump 103 is configured as a mechanical hydraulic pump, which is actuated in response to a rotational driving force of the crankshaft C transmitted thereto and which is configured so as to discharge an engine oil (an example of the operation fluid). As illustrated in FIG. 1, the pump 103 sucks the engine oil stored at an oil pan 104 and discharges the engine oil to a downstream of a flow of the engine oil through an oil filter. The discharged engine oil is supplied to the fluid pressure chambers 4 and a main oil gallery 105. A flow passage of the engine oil supplied to the fluid pressure chambers 4 is divided into two flow passages, so that the engine oil is supplied to the lock mechanism 5 via the OSV 9 in addition to the supply of the engine oil to the fluid pressure chambers 4 via the OCV 8. The engine oil discharged from the fluid pressure chambers 4 and the lock mechanism 5 are returned to the oil pan 104. The engine oil leaking from the valve timing control apparatus and the return oil from the main oil gallery 105 are also collected at the oil pan 104 along a cover and the like.

A pressure increasing mechanism 7 is provided between the pump 103 on the one hand and the OCV 8 and the OSV 9 on the other hand. The engine oil discharged from the pump 103 is supplied to the main oil gallery 105, the OCV 8 and the OSV 9 via the pressure increasing mechanism 7. In a case where the pressure increasing mechanism 7 is actuated, a flow area of the flow passage connected to the main oil gallery 105 is narrowed, so that an operation fluid pressure of the engine oil flowing to the OCV 8 and the OSV 9 from the pressure increasing mechanism 7 is increased.

Each of the pressure increasing mechanism 7, the OCV 8 and the OSV 9 is controlled by an engine control unit (ECU) 6. Furthermore, each fluid passage, through which the operation fluid flows, is formed at a cylinder case and the like.

[Housing and Inner Rotor]

As illustrated in FIG. 1, the inner rotor 2 is attached at an end portion of the camshaft 101. The housing 1 includes a front plate 11, which is arranged at a position away from the camshaft 101, an outer rotor 12 integrally including a timing sprocket 15, and a rear plate 13 at which the housing 1 is connected to the camshaft 101. The outer rotor 12 is provided radially outwardly of the inner rotor 2 (i.e. the outer rotor 12 is provided on an outer circumferential surface of the inner rotor 2) in a coaxial manner. Then, the outer rotor 12 and the inner rotor 2 are sandwiched by the front plate 11 and the rear plate 13. Furthermore, the front plate 11, the outer rotor 12 and the rear plate 13 are connected with each other by means of a bolt (bolts).

Figure 2:
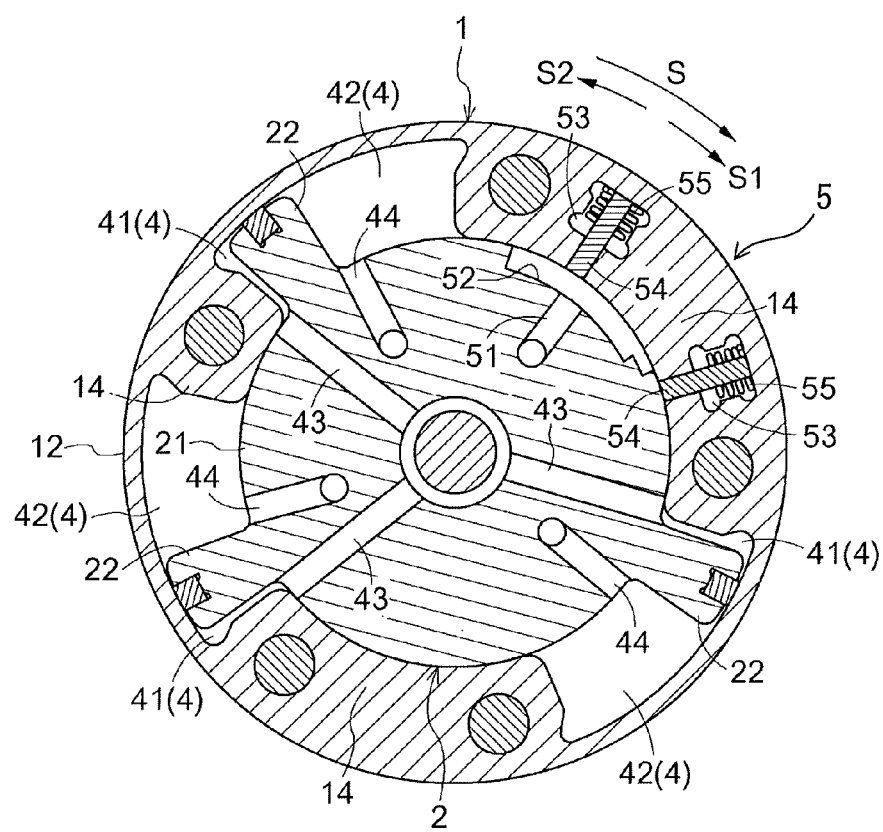
FIG. 2 is a cross-sectional diagram of the valve timing control apparatus taken along line II-II in FIG. 1 in a case where a relative rotational phase is closer to a retarded angle phase relative to an intermediate lock phase.

When the crankshaft C is rotatably driven, the rotational driving force is transmitted to the timing sprocket 15 via a force transmitting member 102, so that the housing 1 is rotatably driven about a rotational axis X of the camshaft 101 in a rotational direction S (see FIG. 2). The inner rotor 2 is rotatably driven about the rotational axis X in the rotational direction S in response to the rotation of the housing 1, so that the camshaft 101 is rotated. Accordingly, the intake valve of the engine E is pressed down by a cam provided at the camshaft 101, thereby opening the intake valve.

As illustrated in FIG. 2, three protruding portions 14, which protrude in a radially inward direction, are formed at the inner rotor 12 while keeping a distance from each other in the rotational direction S. Accordingly, three fluid pressure chambers 4 are defined by the protruding portions 14 and an outer circumferential portion 21 of the inner rotor 2. As illustrated in FIG. 2, three protruding portions 22, which serve as parting portions and each of which protrudes in a radially outward direction, are formed at the inner rotor 2 so as to be positioned within the corresponding fluid pressure chambers 4 and so as to be spaced away from each other in the rotational direction S. Each of the fluid pressure chambers 4 is divided into an advanced angle chamber 41 and a retarded angle chamber 42 along the rotational direction S by the corresponding protruding portion 22.

As illustrated in FIGS. 1 and 2, advanced angle passages 43, each of which is connected to (in communication with) each of the advanced angle chambers 41, are formed at the inner rotor 2 and the camshaft 101. Furthermore, retarded angle passages 44, each of which is connected to (in communication with) each of the retarded angle chambers 42, are formed at the inner rotor 2 and the camshaft 101.

As illustrated in FIG. 1, a torsion spring 3 is provided so as to extend from the inner rotor 2 to the front plate 11. The torsion spring 3 biases the inner rotor 2 in an advanced angle direction so as to resist against an average displacement force in a retarded angle direction based on a cam torque fluctuation. Accordingly, the relative rotational phase is smoothly and promptly shifted in an advanced angle direction S1.

[Lock Mechanism]

As illustrated in FIG. 2, the lock mechanism 5 includes tow plate-shaped lock members 54, a lock groove 52 and a lock passage 51. The lock groove 52 is formed at the outer circumferential portion 21 of the inner rotor 2 so as to have a predetermined width in a relative rotational direction. The lock members 54 is provided within accommodating portions 53, which are formed at one of the three protruding portions 14, respectively, while allowing the lock members 54 to be protrudable and retractable in the radial direction relative to the lock groove 52. Each of the lock members 54 is normally biased in the radially inward direction, in other words, each of the lock members 54 is normally biased towards the lock groove 52 by means of a spring 55. The lock passage 51 connects the lock groove 52 and the OSV 9. The OSV 9 is configured as a spool-type valve, which is electromagnetically controlled. When the OSV 9 is turned to be in an electric power not supplied state (OFF), the engine oil discharged from the pump 103 is supplied to the lock groove 52 via the lock passage 51. On the other hand, when the OSV 9 is turned to be in an electric power supplied state (ON), the engine oil within the lock groove 52 is discharged to the oil pan 104.

Figure 3:
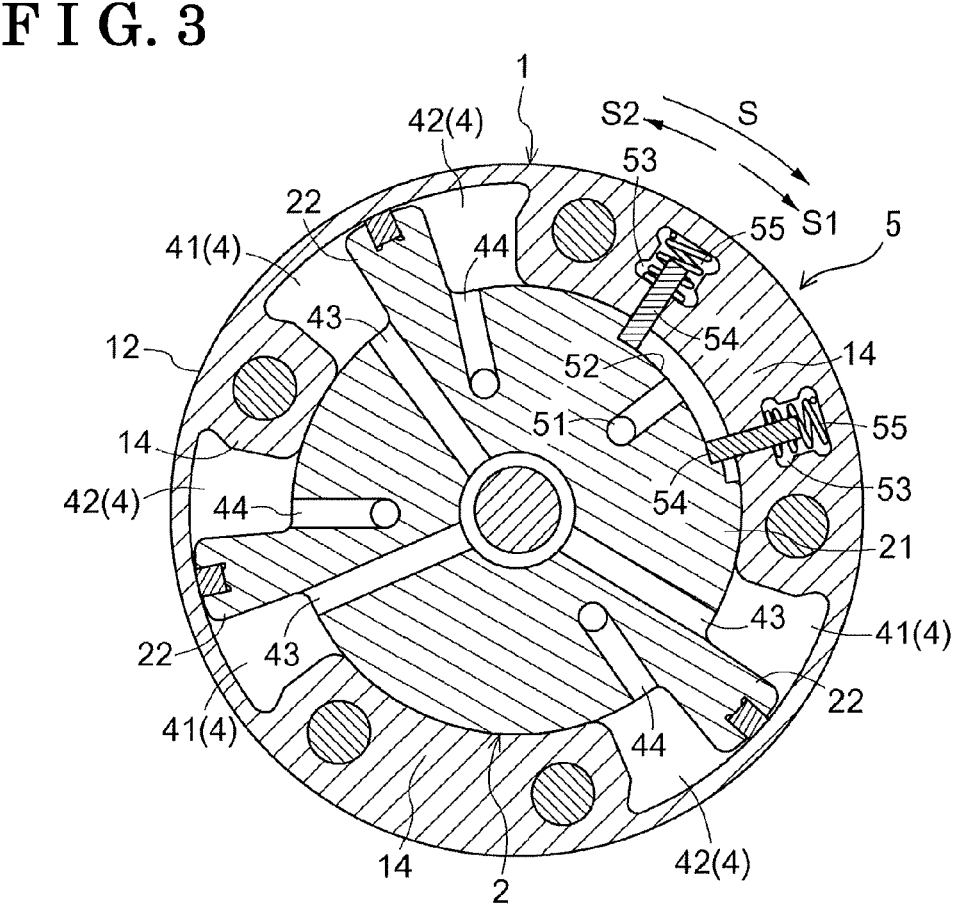
FIG. 3 is a cross-sectional diagram of the valve timing control apparatus taken along line III-III in FIG. 1 in a case where the relative rotational phase is locked at the intermediate lock phase.
Figure 4:
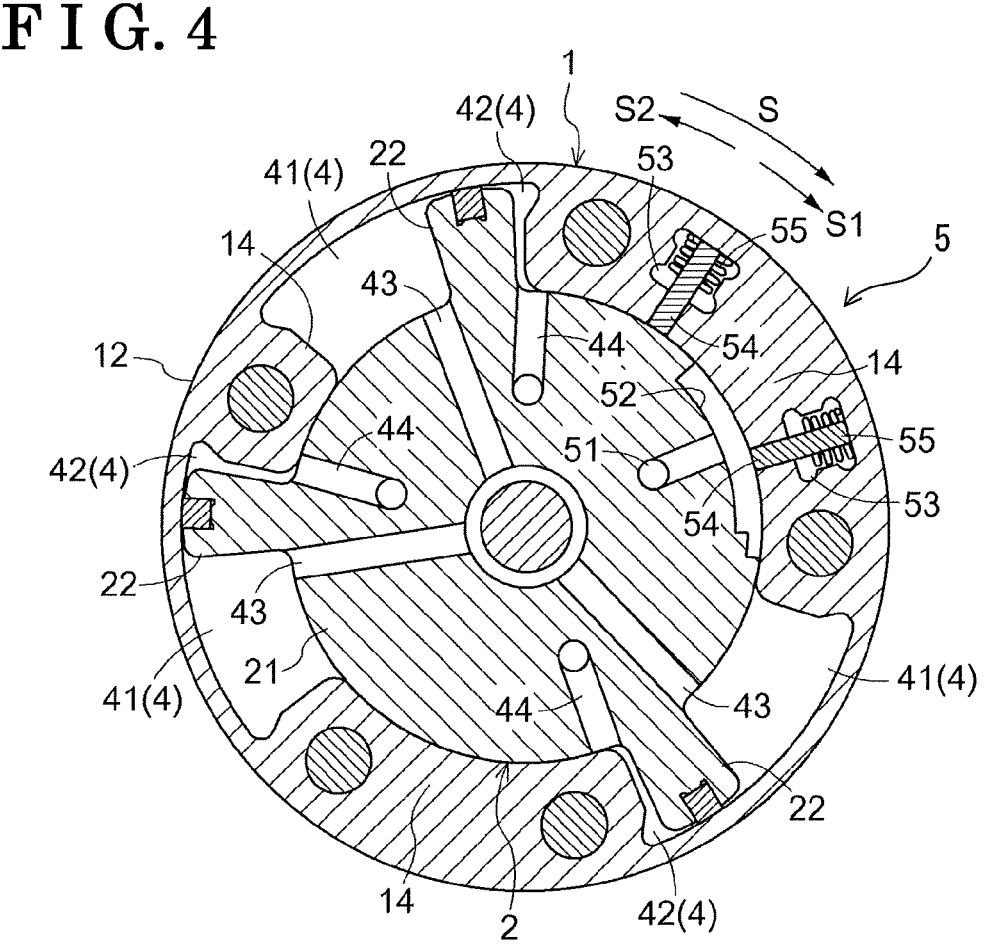
FIG. 4 is a cross-sectional diagram of the valve timing control apparatus taken along line IV-IV in FIG. 1 in a case where the relative rotational phase is closer to an advanced angle phase relative to the intermediate lock phase.

When the engine oil is discharged from the lock groove 52, each of the lock members 54 becomes protrudable into the lock groove 52. As illustrated in FIG. 3, in a case where both of two lock members 54 protrude into the lock groove 52, the lock members 54 engage with respective end portions of the lock groove 52 in the circumferential direction, so that the relative rotational displacement of the inner rotor 2 relative to the housing 1 is locked. As a result, the relative rotational phase is locked at the intermediate lock phase, which corresponds to the predetermined phase. When the engine oil is supplied to the lock groove 52 while the above-mentioned state is established, the lock members 54 are retracted from the lock groove 52, so that the relative rotational phase is unlocked. Accordingly, as illustrated in FIG. 2 or in FIG. 4, the inner rotor 2 becomes relatively rotatably displaceable. Hereinafter, the state where the lock mechanism 5 locks the relative rotational phase at the predetermined phase is referred to as a lock state. On the other hand, the state where the relative rotational phase is unlocked is referred to as an unlocked state. Additionally, a control of turning the OSV 9 to be in the electric power supplied state (ON) in order to establish the lock state is referred to as a lock control.

[OCV]

The OCV 8 is configured as a spool-type valve, which is electromagnetically controlled. The OCV 8 is configured so as to control the supply, the discharge and a supply and discharge amount retention of the engine oil relative to the advanced angle passages 43 and the retarded angle passages 44. The OCV 8 is configured as the spool-type valve and is actuated in response to a control of an amount of an electric power supply by the ECU 6. More specifically, the OCV 8 is configured so as to control the supply of the engine oil to the advanced angle passages 43/the discharge of the engine oil from the retarded angle passages 44, the discharge of the engine oil from the advanced angle passages 43/the supply of the engine oil to the retarded angle passages 44, and an interruption of the supply and discharge of the engine oil to and from the advanced angle passages 43 and the retarded angle passages 44. The control of supplying the engine oil to the advanced angle passages 43 and discharging the engine oil from the retarded angle passages 44 is referred to as an advanced angle control. When the advanced angle control is executed, the protruding portions 22 are relatively rotatably displaced relative to the outer rotor 12 in the advanced angle direction S1, so that the relative rotational phase shifts to the advanced angle phase. On the other hand, the control of discharging the engine oil from the advanced angle passages 43 and the supplying the engine oil to the retarded angle passages 44 is referred to as a retarded angle control. When the retarded angle control is executed, the protruding portions 22 are rotatably displaced relative to the outer rotor 12 in a retarded angle direction S2, so that the relative rotational phase shifts to the retarded angle phase. When the control of interrupting the supply and discharge of the engine oil to and from the advanced angle passages 43 and the retarded angle passages 44 is executed, the relative rotational phase is retained at any desired phase.

The OCV 8 is configured so that the retarded angle control becomes executable when the electric power is supplied to the OCV 8 (ON). On the other hand, when the supply of the electric power to the OCV 8 is stopped (OFF), the advanced angle control becomes executable. Furthermore, the OCV 8 is configured so that an opening degree of the valve is set in response to an adjustment of a duty ratio of the electric power supplied to an electromagnetic solenoid. Accordingly, in this case, a fine adjustment of the supply and discharge of the engine oil may be achieved.

Accordingly, the supply, the discharge and the supply and discharge amount retention of the engine oil relative to the advanced angle chambers 41 and the retarded angle chambers 42 are achieved by controlling the OCV 8, so that an oil pressure of the engine oil acts on the protruding portions 22. As a result, the relative rotational phase may be shifted in the advanced angle direction S1 or in the retarded angle direction S2, or the relative rotational phase may be retained at any desired phase.

[Phase Setting Mechanism and Monitoring Mechanism]

Information relating to a drive of the engine E is collected to the ECU 6, so that the ECU 6 executes a control of each portion on the basis of the collected information. The ECU 6 stores control information of suitable (optimal) phases corresponding to the driving state of the engine E within a memory. The ECU 6 determines the optimal phase on the basis of driving state information obtained from various sensors including a monitoring mechanism in order to control the OCV 8 and OSV 9 to shift the relative rotational phase to the optimal phase.

The ECU 6 normally obtains which phase the relative rotational phase establishes on the basis of detection results of a crank position sensor, which is configured so as to detect a rotational angle of the crankshaft C, and a cam position sensor, which is configured so as to detect a rotational angle of the camshaft 101.

In this embodiment, in a case where the monitoring mechanism detects a signal indicating a likelihood of an occurrence of an engine stall, the ECU 6 executes the control of locking the relative rotational phase at the intermediate lock phase in preparation for a restart of the engine E after the engine stall occurs. Simultaneously, the ECU 6 actuates the pressure increasing mechanism 7 in order to increase the discharge pressure by the pump 103 in order to assist the shift of the relative rotational phase. Accordingly, the ECU 6 serves as a phase setting mechanism. The pressure increasing mechanism 7 is under the control of the ECU 6. Hereinafter, the above-mentioned control executed by the ECU 6 is referred to as an intermediate lock phase setting control.

The engine E is configured to operate by burning the fuel. However, the engine E may stall due to a blowout caused by malfunction of an ignition plug, an ignition coil and the like, a blowout caused by deterioration in drivability, a blowout caused by a malfunction of a control system and the like. These information are intensively controlled by the ECU 6. Furthermore, the engine E includes an injector (a fuel injection device) and a fuel pump. In a case where a malfunction occurs at the injector and the fuel pump, a fuel cut may occur (i.e. a cut of the fuel supply to the engine may occur), which may result in causing the engine stall. Obviously, the engine E stalls when the fuel actually runs out. These information are also intensively controlled by the ECU 6. The information relating to the blow up and the run out of the fuel is normally monitored by various sensors and the like, so that a signal system for obtaining these information is formed between various sensors and the like on the one hand and the ECU 6 on the other hand.

The vehicle, to which the valve timing control apparatus according to the embodiment is adapted, includes an antilock brake system (ABS), so that when the slip occurs at tires of the vehicle because of a sudden brake while the vehicle is traveling on a low friction road, the ABS is actuated in order to reduce a level of the slip. Information relating to an actuation of the ABS is transmitted to the ECU 6.

The ECU 6 executes the intermediate lock phase setting control in a case the ECU 6 obtains the signal relating to the blowout including the malfunction of the components of the engine E or in a case where the ECU 6 obtains the signals from each sensors relating to the fuel cut and the run out of the fuel, because the ECU 6 determines that the engine E may stall. Accordingly, a portion of the ECU 6 obtaining the signals from various sensors and the signal relating to the actuation of the ABS corresponds to the monitoring mechanism.

[Pressure Increasing Mechanism]

Figure 5A:
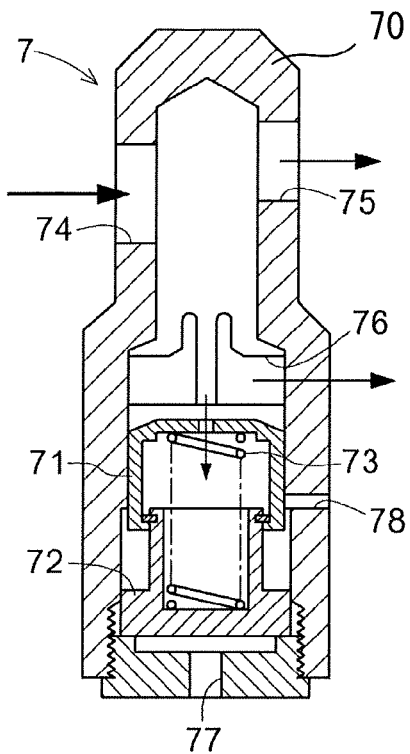
FIG. 5A is a diagram illustrating a pressure increasing mechanism, which is not actuated.
Figure 5B:
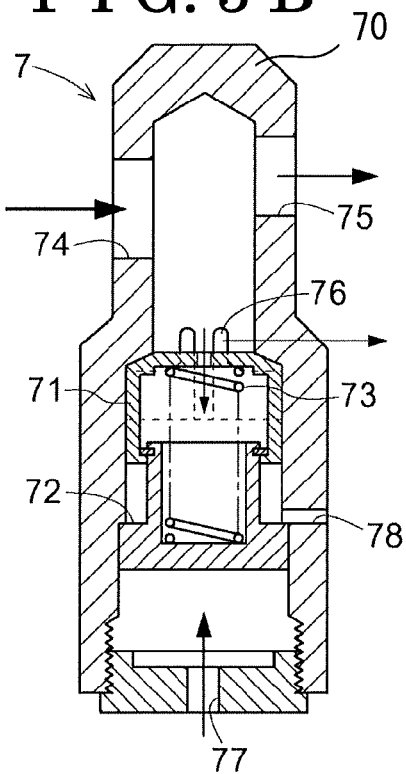
FIG. 5B is a diagram illustrating an operation state of the pressure increasing mechanism in a case where the pressure increasing mechanism is actuated and where a number of engine rotations is small.
Figure 5C:
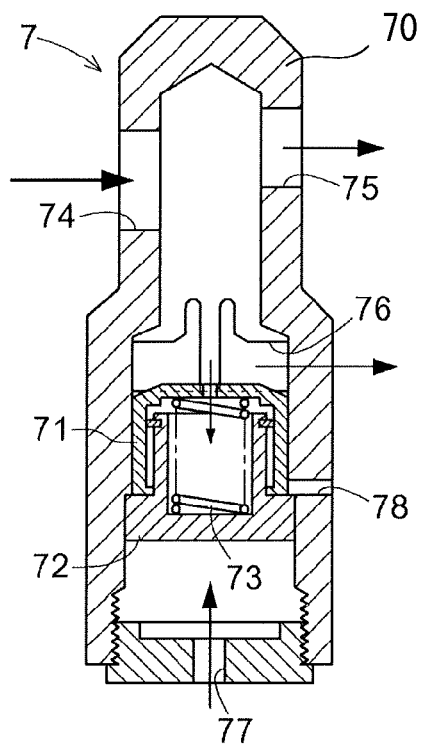
FIG. 5C is a diagram illustrating an operation state of the pressure increasing mechanism in a case where the pressure increasing mechanism is actuated and where the number of engine rotations is great.

A configuration of the pressure increasing mechanism 7 will be described below in detail with reference to FIGS. 1 and 5. Illustrated in FIG. 5A is a state where the pressure increasing mechanism 7 is not actuated. Illustrated in FIG. 5B is a state where the pressure increasing mechanism 7 is actuated and where the number of engine rotations is small. On the other hand, illustrated in FIG. 5C is a state where the pressure increasing mechanism 7 is actuated and where the number of engine rotations is high. Additionally, in the following explanation about the pressure increasing mechanism 7, an upward direction on the paper is referred to as "up" and a downward direction on the paper is referred to as "down".

The pressure increasing mechanism 7 is configured to include a spool 71 and a retainer 72 within a housing 70, which is formed at a cylinder case and the like. The spool 71 is formed in a cup-shape. The retainer 72 is formed in a cylinder shape having a bottom cover and is formed so as to be accommodatable within the spool 71. An outer circumferential portion of a bottom portion of the retainer 72 is formed to protrude in a flange shape. An inner space of the housing 70 is formed to extend in an up-and-down direction and so that a diameter thereof decreases towards an upper portion of the housing 70 in order to form a stepped shape. An outer diameter of the spool 71 is formed to correspond to an inner diameter of the housing 70 at an intermediate portion thereof. On the other hand, an outer diameter of the flange portion of the retainer 72 is formed to correspond to an inner diameter of the housing 70 at a lower portion thereof. Accordingly, the spool 71 and the retainer 72 are slidably movable within the housing 70 along an inner shape thereof, while the displacement of the spool 71 in an upward direction is restricted by a contact between an upper surface of the spool 71 and an upper diameter decreased portion of the housing 70 as illustrated in FIG. 5B. A spring 73 is provided between the spool 71 and the retainer 72, so as to bias the spool 71 and the retainer 72 in a direction where the spool 71 and the retainer 72 are displaced away from each other.

A flow inlet 74, through which the engine oil discharged from the pump 103 flows into the pressure increasing mechanism 7, an OCV/OSV communication port 75, through which a communication between the pressure increasing mechanism 7 on the one hand and the OCV 8 and the OSV 9 is established, and a main oil gallery communication port 76, through which a communication between the pressure increasing mechanism 7 and the main oil gallery 105 is established, are formed at an upper portion of the housing 70. Furthermore, an operational supply port 77, through which the engine oil flowing at the upstream relative to the flow inlet 74 is allowed to flow into the pressure increasing mechanism 7, is formed at a bottom portion of the housing 70. The main oil gallery communication port 76 is formed to extend from the upper portion to the intermediate portion of the housing 70. Furthermore, the main oil gallery communication port 76 is formed so that a cross-sectional area thereof decreases at an upper portion thereof. The cross-sectional area of the main oil gallery communication port 76 is reduced as the spool 71 is displaced in the upward direction. When the spool 71 is displaced to an upper most position within a movable range of the spool 71, the cross-sectional area of the main oil gallery communication port 71 becomes a minimum.

A through hole is formed at an upper surface portion of the spool 71 in order to establish a communication between the flow inlet 74 and the retainer 72. Accordingly, the engine oil flowing into the pressure increasing mechanism 7 from the flow inlet 74 is allowed to flow into a space formed between the spool 71 and the retainer 72.

The pressure increasing mechanism 7 includes a pressure increasing oil switching valve 79 (a pressure increasing OSV 79) between the pump 103 and the operational supply port 77. In a case where the pressure increasing OSV 79 is in a state where electric power is supplied thereto (i.e. in a case where the pressure increasing OSV 79 is turned on), the engine oil is allowed to flow into the pressure increasing mechanism 7 via the operational supply port 77. A force in the upward direction generated by the oil pressure of the engine oil flowing into the pressure increasing mechanism 7 from the operational supply port 77 acts on the retainer 72, so that the retainer 72 is displaced in the upward direction as illustrated in FIG. 5B or in FIG. 5C. In a case where the number of engine rotations is low and the discharge pressure of the pump 103 is low, the spool 71 is displaced away from the retainer 72 by a biasing force generated by the spring 73, so that the spool 71 is displaced to the upper most position within the movable range of the spool 71, as illustrated in FIG. 5B. In other words, a cross-sectional diagram of the main oil gallery communication port 76 becomes a minimum, so that the oil flowing through the OCV/OSV communication port 75 increases. As a result, the oil pressure of the engine oil flowing towards the OCV 8 and the OSV 9 increases. On the other hand, in a case where the number of engine rotations is great and the discharge pressure of the pump 103 is high, the spool 71 is disclosed towards the retainer 72 by the oil pressure of the engine oil flowing into the pressure increasing mechanism 7 from the flow inlet 74 as illustrated in FIG. 5C. In other words, the main oil gallery communication port 76 is opened, so that the engine oil is supplied to the OCV 8, the OSV 9 and the main oil gallery 105 while applying an equal oil pressure thereto.

In a case where the pressure increasing OSV 79 is in a state where the electric power is not supplied thereto (i.e. in a case where the pressure increasing OSV 79 is turned off), the engine oil is discharged from the pressure increasing mechanism 7 via the operational supply port 77. Accordingly, both of the spool 71 and the retainer 72 are displaced in the downward direction, so that the main oil gallery communication port 76 is fully opened. As a result, the engine oil is supplied to the OCV 8, the OSV 9 and the main oil gallery 105 while applying the equal oil pressure thereto.

Accordingly, because the pressure increasing mechanism 7 is configured so that the oil pressure applied to the OCV 8 and OSV 9 is increased in priority to the oil pressure applied to the main oil gallery 105, for example, the relative rotational phase may be appropriately shifted even in the case where the number of engine rotations is low and the discharge pressure of the pump 103 is low.

Additionally, as illustrated in FIGS. 5A, 5B and 5C, a discharge port 78 is formed at the housing 70 of the pressure increasing mechanism 7, so that the oil leaking to a clearance formed between an outer circumferential portion of the retained 72 and an inner circumferential surface of the housing 70 is discharged from the discharge port 78. Therefore, interference to the relative displacement between the spool 71 and the retainer 72 is avoidable.

[Intermediate Lock Phase Setting Control]

Figure 6:
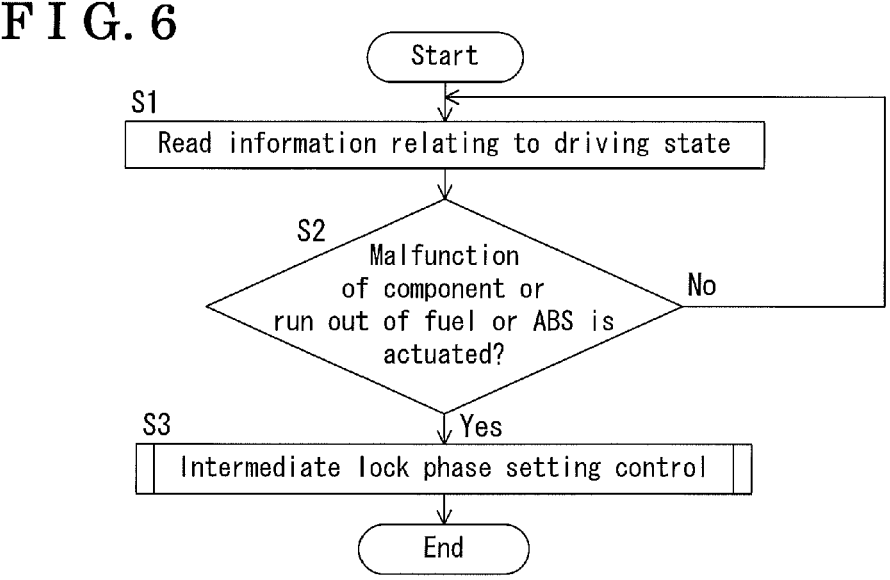
FIG. 6 is a flowchart illustrating a control of the valve timing control apparatus.
Figure 7:
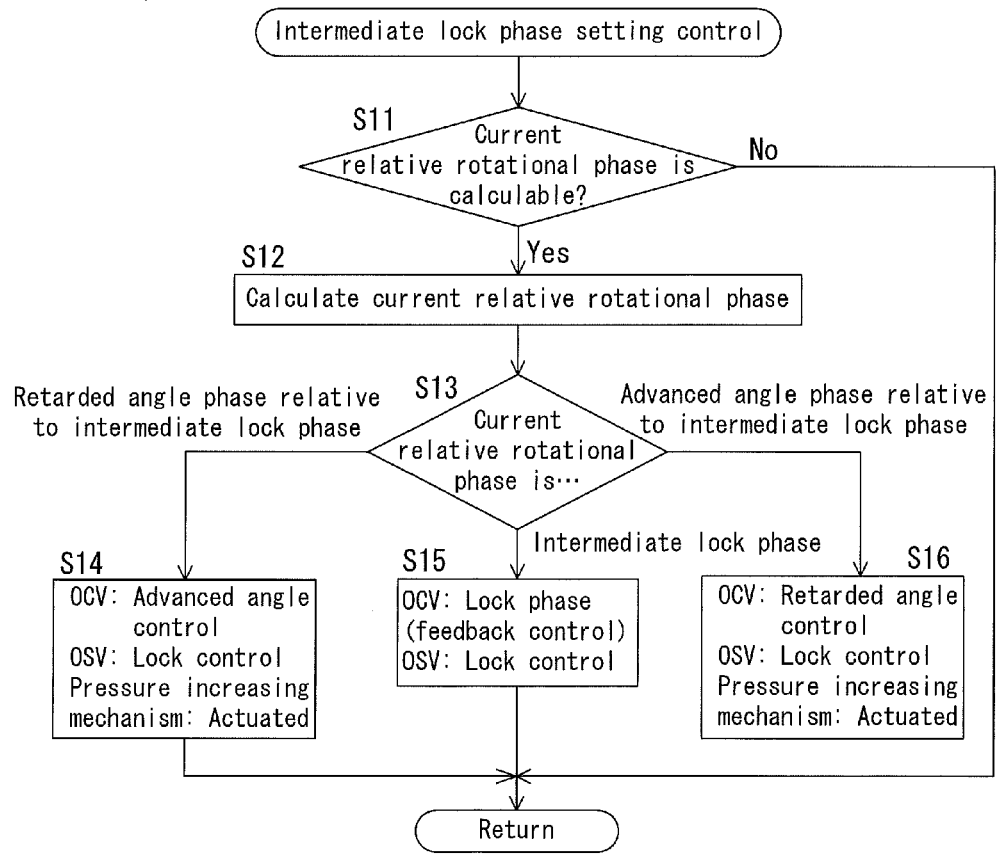
FIG. 7 is a subroutine flowchart illustrating an intermediate lock phase setting control.
Figure 8:
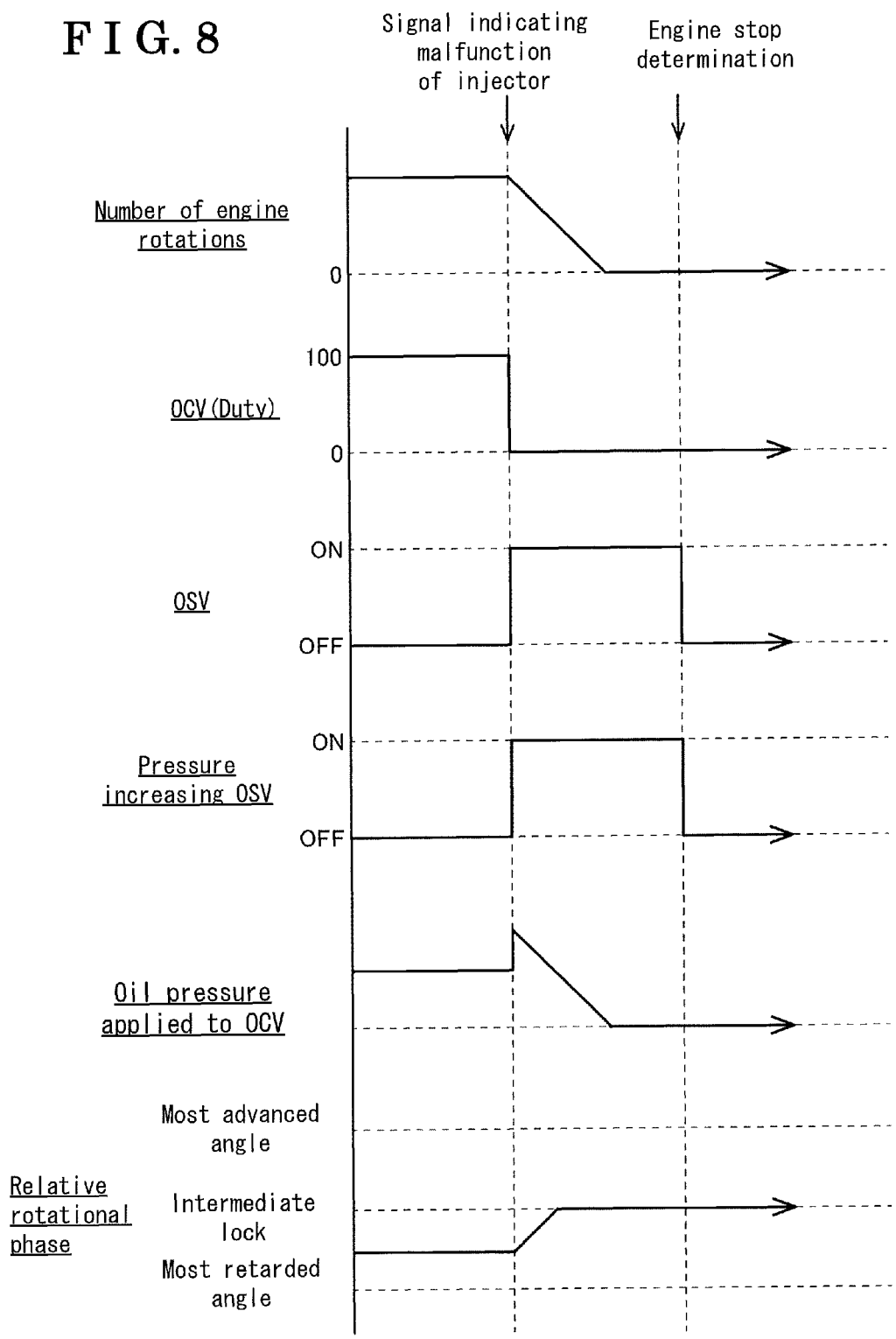
FIG. 8 is a diagram illustrating an operation of each portion in response to a control by a phase setting mechanism.

An operation of the valve timing control apparatus in response to the control executed by the ECU 6 will be described below with reference to FIGS. 6 and 8. As illustrated in FIG. 6, the ECU 6 normally reads the information relating to the driving state (step S1). The information relating to the driving state refers to information obtained from the above-described various sensors (step S2). In a case where no abnormal information is obtained (No in step S2), i.e. in a case where no information relating to the malfunction of the components of the engine E, the run out of the fuel including the fuel cut or the actuation of the ABS is obtained, the process returns to step S1 where the ECU 6 newly reads the information relating to the driving state. On the other hand, in a case where the ECU 6 reads the information relating to any one of the malfunction of the components of the engine E, the run out of the fuel including the fuel cut and the actuation of the ABS (Yes in step S2), the ECU 6 executes the intermediate lock phase setting control because the engine E may stall (step S3). The relative rotational phase is locked at the intermediate lock phase in response to the intermediate lock phase setting control executed by the ECU 6. Accordingly, in the case where the engine E eventually stalls thereafter, the engine E may be appropriately restarted while the intermediate lock phase is established. On the other hand, in a case where the engine E does not eventually stall thereafter, the engine E is kept driven while the relative rotational phase establishes the intermediate lock phase until the components causing the malfunction is changed, the fuel is supplied, or the ABS stops actuating.

A detailed explanation about the intermediate lock phase setting control is described below. In the case where the ECU 6 obtains the signal indicating the likelihood of the occurrence of the engine stall, the ECU 6 determines where or not a current relative rotational phase is calculable (step S11). In a case where the ECU 6 determines that the current relative rotational phase is not calculable because the malfunction occurs at the crankshaft position sensor and the like (No in step S11), the ECU 6 terminates the intermediate lock phase setting control without executing any control. On the other hand, in a case where the ECU 6 determines that the current relative rotational phase is calculable (Yes in step S11), the ECU 6 calculates the current relative rotational phase (step S12). Then, the ECU 6 determines whether the current relative rotational phase establishes the retarded angle phase relative to the intermediate lock phase (i.e. the state illustrated in FIG. 2), the intermediate lock phase (i.e. the state where the unlock state is established as illustrated in FIG. 3), or the advanced angle phase relative to the intermediate lock phase (i.e. the state illustrated in FIG. 4) (step S13).

In a case where the ECU 6 determines that the current relative rotational phase establishes the retarded angle phase relative to the intermediate lock phase, the ECU 6 executes the advanced angle control to the OCV 8 (duty ratio is zero percent (0%)) and the lock control to the OSV 9 (the OSV 9 is turned on), and the ECU 6 actuates the pressure increasing mechanism 7 (step S14). Accordingly, the relative rotational phase is promptly and surely shifted to establish the advanced angle phase in order to establish the lock state when the relative rotational phase forms the intermediate lock phase. In other words, the state of the valve timing control apparatus is shifted from the state illustrated in FIG. 2 to the state illustrated in FIG. 3. For example, illustrated in FIG. 8 is an operation state of each component in the case where the malfunction occurs at the injector while the relative rotational phase establishes the retarded angle phase relative to the intermediate lock phase. The intermediate lock phase setting control is executed in the above-described manner, so that the OSV 9 and the pressure increase OSV 79 are turned to be the state where the electric power is not applied there to (i.e. the OSV 9 and the pressure increasing OSV 79 are turned off) in a case where the ECU 6 eventually determines that the engine E is stopped.

In a case where the ECU 6 determines that the current relative rotational phase establishes the intermediate lock phase, the ECU 6 executes a feedback control to the OCV 8 in order to maintain the lock phase and the lock control to the OSV 9 (i.e. the control of turning on the OSV 9) (step S15). Accordingly, the relative rotational phase is maintained to establish the intermediate lock phase. In other words, the state of the valve timing control apparatus is shifted from the state where the unlock state is established (see FIG. 3) to the state illustrated in FIG. 3.

In a case where the ECU 6 determines that the current relative rotational phase establishes the advanced angle phase relative to the intermediate lock phase, the ECU 6 executes the retarded angle control to the OCV 8 (duty ratio 100%) and the lock control to the OSV 9 (i.e. the control of turning on the OSV 9), and actuates the pressure increasing mechanism 7 (i.e. turns on the pressure increasing OSV 79) (step S16). Accordingly, the relative rotational phase is promptly and surely shifted to the retarded angle phase in order to establish the lock state when the relative rotational phase forms the intermediate lock phase. In other words, the state of the valve timing control apparatus is shifted from the state illustrated in FIG. 4 to the state illustrated in FIG. 3.

Accordingly, the intermediate lock phase setting control is promptly executed in a case where the likelihood of the engine stall exists while the relative rotational phase establishes any phase. As a result, even if the engine E eventually stalls, the engine E may be appropriately restarted.

Other Embodiments

Figure 9:
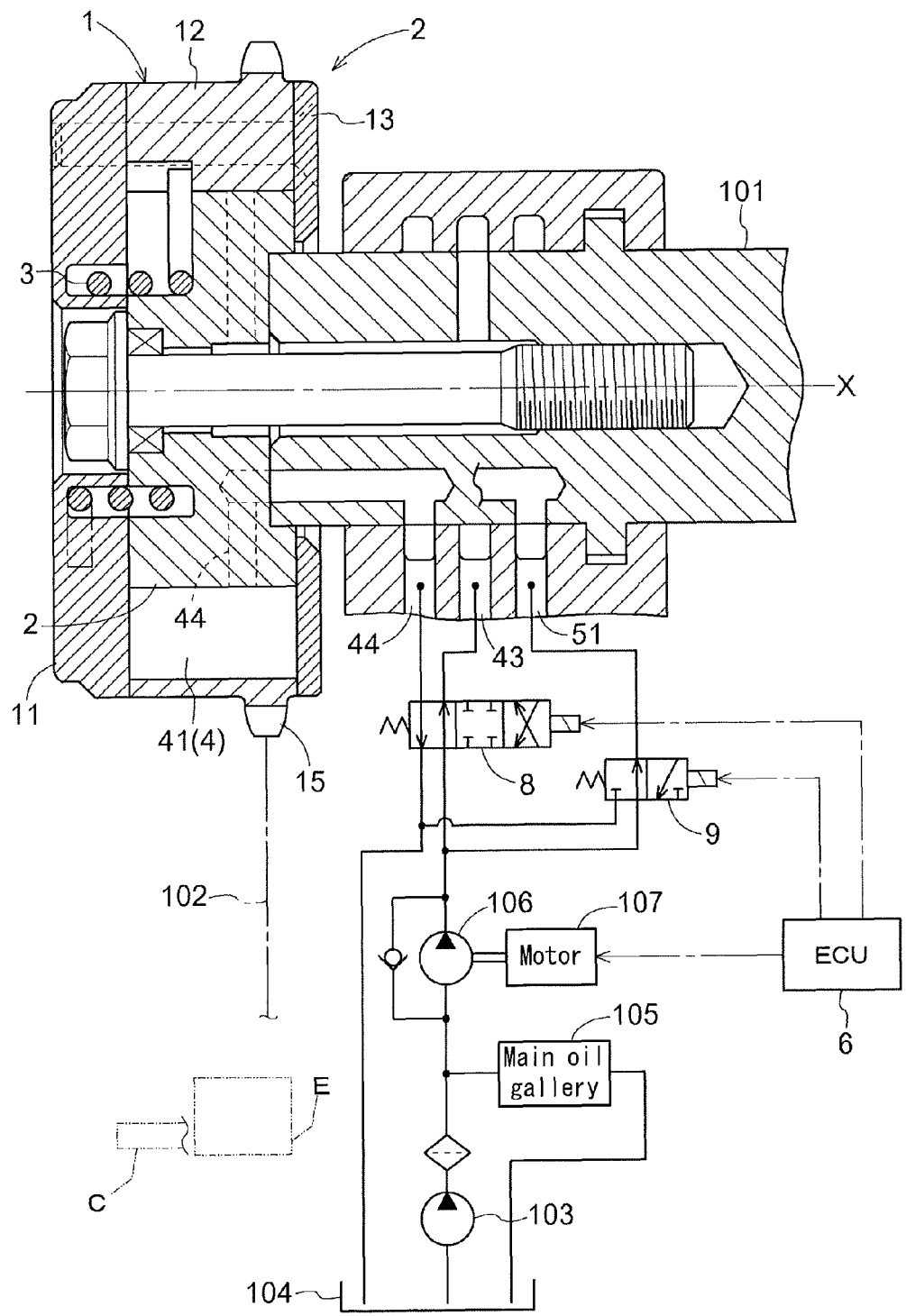
FIG. 9 is a cross-sectional diagram illustrating a configuration of a valve timing control apparatus according to another embodiment.

In the above-described embodiment, the pressure increasing mechanism 7 is configured so as to include the spool 71 and the retainer 72. However, the pressure increasing mechanism 7 may be modified so as to include an electric pump 106 separately and independently of the pump 103 (see FIG. 9). Configurations of the pressure increasing mechanism 7 apart from the electric pump 106 are similar to the configurations of the pressure increasing mechanism 7 according to the above-described embodiment. Therefore, only the differences between the pressure increasing mechanism 7 according to the above-described embodiment and the pressure increasing mechanism 7 having the electric pump 106 are described below. Additionally, the same reference numerals are assigned to the identical components and portions of the pressure increasing mechanism 7. The electric pump 106 serving as the pressure increasing mechanism 7 is actuated by a motor 107. Furthermore, the electric pump 106 is provided between the pump 103 on the one hand and the OCV 8 and the OSV 9 on the other hand. In the case where the ECU 6 obtains the signal indicating that the engine E may stall from the monitoring mechanism, the ECU 6 controls the electric power to be supplied to the motor 107 in order to actuate the electric pump 106. Accordingly, the discharge pressure of the pump 103 is assisted, so that the oil pressure applied to the OCV 8 and the OSV 9 is increased. In this modified example, a flow passage through which the engine oil is supplied to the main oil gallery 105 is diverged from a flow passage connecting the pump 103 and the electric pump 106, so that the oil pressure applied to the main oil gallery 105 is not influenced by an actuation of the pump 106.

In the above-described embodiment, the valve timing control apparatus is configured so that the ECU 6 monitors the signals indicating the malfunction of the components of the engine E, the signal indicating the run out of the fuel including the fuel cut and the signal indicating the actuation of the ABS. However, the valve timing control apparatus may be modified so that the ECU 6 monitors other signals and the signal indicating the likelihood of the occurrence of the engine stall.

In the above-described embodiment and in the modified example, the valve timing control apparatus is configured so as to include the pressure increasing mechanism 7. However, the valve timing control apparatus may be configured so as not to include the pressure increasing mechanism 7.

In the above-described embodiment, the torsion spring 3 for biasing the inner rotor 2 in the advanced angle direction is provided at the valve timing control apparatus. However, the valve timing control apparatus may be modified so as to include a torsion spring for biasing inner rotor 2 in the retarded phase angle direction. Alternatively, the valve timing control apparatus may be modified so as not to include the torsion spring 3.

In the above-described embodiment, the valve timing control apparatus provided at the intake valve is explained. However, the valve timing control apparatus may be provided at the exhaust valve in addition to the intake valve. Furthermore, the valve timing control apparatus according to the embodiment may be provided only at the exhaust valve instead of the intake valve.

In the above-described embodiment, the mechanical hydraulic pump, which is actuated in response to the rotational force transmitted thereto from the crankshaft C, is adapted as the pump 103. However, any type of pump, for example, an electric pump may be adapted as the pump 103.

In the above-described embodiment, the Atkinson area is used. However, the valve timing control apparatus may be modified so as to set the intermediate lock phase at any desired phase suitable for restarting the engine E without using the Atkinson area.

Accordingly, the valve timing control apparatus suitable to use the Atkinson area may be achieved.

According to the embodiment and the modified examples, the valve timing control apparatus includes the housing 1 synchronously rotated relative to the crankshaft C of the engine E, the inner rotor 2 arranged in the coaxial manner relative to the housing 1 and synchronously rotated relative to the camshaft 101 for opening and closing the valve of the engine E, the fluid pressure chambers 4 formed by the housing 1 and the inner rotor 2 and divided into the retarded angle chambers 42 and the advanced angle chambers 41 by means of the protruding portions 22, each of which is provided at least one of the housing 1 and the inner rotor 2, the OCV 8 controlling the supply of the engine oil discharged from the pump 103, which is configured to be actuated in response to the rotation of the engine E, to the fluid pressure chambers 4 and the discharge of the engine oil from the fluid pressure chambers 4, the lock mechanism 5 configured so as to lock a relative rotational phase of the inner rotor 2 relative to the housing 1 at the intermediate lock phase, which is set as the phase falling within the advanced angle phase relative to the phase range in the most retarded angle phase not suitable to restart the engine E, the monitoring mechanism (i.e. the portion of the ECU 6) monitoring the driving state of the engine E, and the phase setting mechanism (i.e. the ECU 6) controlling the OCV 8 so that the relative rotational phase establishes the intermediate lock phase in the case where the monitoring mechanism detects the signal indicating the likelihood of the decrease of the number of rotations of the engine E exceeding a control range.

Accordingly, the valve timing control apparatus, whose phase range not suitable for starting the engine E is set at the most retarded angle phase, is configured so that the ECU 6 shifts the relative rotational phase to form the intermediate lock phase in the case where the number of rotations of the engine E exceeds the control range, in other words, on the basis of the signal indicating the likelihood of the occurrence of the engine stall. More specifically, the relative rotational phase control is executed simultaneously to a timing when the number of rotations of the engine E starts decreasing, or at least before the number of rotations of the engine E starts decreasing. Accordingly, the pump 103 discharges the engine oil while the discharge pressure thereof does not decrease much, so that the relative rotational phase is surely shifted. Furthermore, a duration time of the phase control is extended because of the early start of the phase control, so that the relative rotational phase is surely shifted to the intermediate lock phase. As a result, even if the engine E eventually stalls, the engine E may be appropriately started while the relative rotational phase establishes the intermediate lock phase.

The phase range not suitable for starting the engine E refers to the Atkinson area. More specifically, the phase range not suitable for staring the engine E refers to the phase range from the intermediate phase between the most retarded angle phase and the most advanced angle phase to the most retarded angle phase (including the intermediate phase and the most retarded angle phase).

According to the embodiment and the modified examples, the signal includes the signal indicating the malfunction of the component(s) of the engine E.

Generally, the malfunction of each component of the engine E is sensed. Therefore, in the case where the valve timing control apparatus is configured so as to determine the likelihood of the occurrence of the engine stall on the basis of the signal indicating the malfunction of each component of the engine E, any specific sensor and the like does not need to be additionally provided at the engine E and the like. Furthermore, the likelihood of the occurrence of the engine stall because of the malfunction of the components of the engine E is high, in other words, the signal indicating the likelihood of the occurrence of the engine stall is reliable. Accordingly, the control of shifting the relative rotational phase to the intermediate lock phase on the basis of the signal indicating the malfunction of the components of the engine E is reliable.

According to the embodiment and the modified examples, the signal includes the signal indicating the run out of the fuel including the fuel cut.

Generally, the run out of the fuel including the fuel cut is sensed. Therefore, in the case where the valve timing control apparatus is configured so as to determine the likelihood of the occurrence of the engine stall on the basis of the signal indicating the run out of the fuel including the fuel cut, any specific sensor and the like does not need to be additionally provided at the engine E and the like. Furthermore, the likelihood of the occurrence of the engine stall because of the run out of the fuel or the fuel cut is high, in other words, the signal indicating the likelihood of the occurrence of the engine stall is reliable. Accordingly, the control of shifting the relative rotational phase to the intermediate lock phase on the basis of the signal indicating the run out of the fuel including the fuel cut is reliable.

According to the embodiment and the modified examples, the signal includes the signal indicating the actuation of the antilock brake system.

In a case where the tires slip because of the sudden brake while the vehicle is traveling on the low friction road, the locking of the tires because of the sudden brake rapidly decreases the number of rotations of the engine E, which may result in causing the engine stall. Therefore, in the case where the valve timing control apparatus is configured so as to determine the likelihood of the occurrence of the engine stall on the basis of the signal indicating the actuation of the ABS, which is configured so as to unlock the tires when the slip is detected, any specific sensor and the like does not need to be additionally provided at the engine E and the like.

According to the embodiment and the modified examples, the phase setting mechanism (i.e. the ECU 6) includes the pressure increasing mechanism 7, which is configured so as to increase the oil pressure of the engine oil.

Accordingly, in the case where the valve timing control apparatus is configured so as to include the pressure increasing mechanism 7 for increasing the oil pressure of the engine oil, the decrease of the discharge pressure of the pump 103 because of the decrease of the number of rotations of the engine E may be compensated. Hence, certainty of shifting the relative rotational phase to the intermediate lock phase may be increased.

According to the embodiment and the modified examples, the pressure increasing mechanism 7 is actuated in the case where the signal is detected while the relative rotational phase establishes the phase other than the intermediate lock phase.

According to the embodiment and the modified examples, a valve timing control apparatus includes the housing 1 synchronously rotated relative to the crankshaft C of the engine E, the inner rotor 2 arranged in the coaxial manner relative to the housing 1 and synchronously rotated relative to the camshaft 101 for opening and closing the valve of the engine E, the fluid pressure chambers 4 formed by the housing 1 and the inner rotor 2 and divided into the retarded angle chambers 42 and the advanced angle chambers 41 by means of the protruding portions 22, each of which is provided at least one of the housing 1 and the inner rotor 2, the OCV 8 controlling the supply of the engine oil discharged from the pump 103 to the fluid pressure chambers 4 and the discharge of the engine oil from the fluid pressure chambers 4, the lock mechanism 5 configured so as to lock the relative rotational phase of the inner rotor 2 relative to the housing 1 at the intermediate lock phase between the most retarded angle phase and the most advanced angle phase, the monitoring mechanism (i.e. the portion of the ECU 6) monitoring the driving state of the engine E, and the phase setting mechanism (i.e. the ECU 6) controlling the OCV 8 so that the relative rotational phase establishes the intermediate lock phase in the case where the monitoring mechanism detects the signal indicating the likelihood of the decrease of the number of rotations of the engine E.

Accordingly, the valve timing control apparatus is configured so as to set the relative rotational phase to the intermediate lock phase in the case where the valve timing control apparatus detects the likelihood of the decrease of the number of rotations of the engine E, with or without using the Atkinson area. Therefore, for example, in the case where the intermediate lock phase is set to the phase suitable for starting the engine E, the relative rotational phase is set to the intermediate lock phase in any case where the engine E is stopped due to any factor, so that the engine E may be normally appropriately restarted thereafter.

According to the embodiment and the modified examples, the phase setting mechanism (i.e. the ECU 6) controls the OCV 8 so that the relative rotational phase corresponds to the intermediate lock phase in the case where the monitoring mechanism (i.e. the portion of the ECU 6) detects the signal indicating the likelihood of the decrease of the number of rotations of the engine E exceeding a control range.

Accordingly, the relative rotational phase may be set to the intermediate lock phase even when, specifically, the engine E is stopped because of the engine stall. Therefore, even in the case where the engine E is stopped due to an unexpected factor, the engine E may be appropriately started thereafter.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A valve timing control apparatus comprising:
   a driving-side rotating member synchronously rotated relative to a crankshaft of an internal combustion engine;
   a driven-side rotating member arranged in a coaxial manner relative to the driving-side rotating member and synchronously rotated relative to a camshaft for opening and closing a valve of the internal combustion engine;
   a fluid pressure chamber formed by the driving-side rotating member and the driven-side rotating member and divided into a retarded angle chamber and an advanced angle chamber by means of a parting portion, which is provided at at least one of the driving-side rotating member and the driven-side rotating member;

a fluid control valve mechanism controlling a supply of an operation fluid discharged from a pump, which is configured to be actuated in response to a rotation of the internal combustion engine, to the fluid pressure chamber and a discharge of the operation fluid from the fluid pressure chamber;

a lock mechanism configured so as to lock a relative rotational phase of the driven-side rotating member relative to the driving-side rotating member at a predetermined phase, which is set as a phase falling within an advanced angle phase relative to a phase range in the most retarded angle phase not suitable to restart the internal combustion engine;

a monitoring mechanism monitoring a driving state of the internal combustion engine;

a phase setting mechanism controlling the fluid control valve mechanism so that the relative rotational phase establishes the predetermined phase in a case where the monitoring mechanism detects a signal indicating a likelihood of a decrease of a number of rotations of the internal combustion engine exceeding a control range;

the phase setting mechanism including a pressure increasing mechanism, which is configured to increase a fluid pressure of the operation fluid; and in a case where the pressure increasing mechanism is actuated, a flow area of a flow passage connected to a main fluid gallery is narrowed so that operation fluid pressure of the operation fluid flowing to the fluid pressure chamber from the pressure increasing mechanism is increased.

2. The valve timing control apparatus according to claim 1, wherein the signal includes a signal indicating a malfunction of a component of the internal combustion engine.

3. The valve timing control apparatus according to claim 1, wherein the signal includes a signal indicating a run out of a fuel including a fuel cut.

4. The valve timing control apparatus according to claim 1, wherein the signal includes a signal indicating an actuation of an antilock brake system.

5. The valve timing control apparatus according to claim 2, wherein the phase setting mechanism includes a pressure increasing mechanism, which is configured so as to increase a fluid pressure of the operation fluid.

6. The valve timing control apparatus according to claim 3, wherein the phase setting mechanism includes a pressure increasing mechanism, which is configured so as to increase a fluid pressure of the operation fluid.

7. The valve timing control apparatus according to claim 4, wherein the phase setting mechanism includes a pressure increasing mechanism, which is configured so as to increase a fluid pressure of the operation fluid.

8. The valve timing control apparatus according to claim 1, wherein the pressure increasing mechanism is actuated in a case where the signal is detected while the relative rotational phase establishes a phase other than the predetermined phase.

9. The valve timing control apparatus according to claim 5, wherein the pressure increasing mechanism is actuated in a case where the signal is detected while the relative rotational phase establishes a phase other than the predetermined phase.

10. The valve timing control apparatus according to claim 6, wherein the pressure increasing mechanism is actuated in a case where the signal is detected while the relative rotational phase establishes a phase other than the predetermined phase.

11. The valve timing control apparatus according to claim 7, wherein the pressure increasing mechanism is actuated in a case where the signal is detected while the relative rotational phase establishes a phase other than the predetermined phase.

12. A valve timing control apparatus comprising:

a driving-side rotating member synchronously rotated relative to a crankshaft of an internal combustion engine;

a driven-side rotating member arranged in a coaxial manner relative to the driving-side rotating member and synchronously rotated relative to a camshaft for opening and closing a valve of the internal combustion engine;

a fluid pressure chamber formed by the driving-side rotating member and the driven-side rotating member and divided into a retarded angle chamber and an advanced angle chamber by means of a parting portion, which is provided at at least one of the driving-side rotating member and the driven-side rotating member;

a fluid control valve mechanism controlling a supply of an operation fluid discharged from a pump to the fluid pressure chamber and a discharge of the operation fluid from the fluid pressure chamber;

a lock mechanism configured so as to lock a relative rotational phase of the driven-side rotating member relative to the driving-side rotating member at a predetermined phase between a most retarded angle phase and a most advanced angle phase;

a monitoring mechanism monitoring a driving state of the internal combustion engine;

a phase setting mechanism controlling the fluid control valve mechanism so that the relative rotational phase establishes the predetermined phase in a case where the monitoring mechanism detects a signal indicating a likelihood of a decrease of a number of rotations of the internal combustion engine;

the phase setting mechanism including a pressure increasing mechanism, which is configured to increase a fluid pressure of the operation fluid; and in a case where the pressure increasing mechanism is actuated, a flow area of a flow passage connected to a main fluid gallery is narrowed so that operation fluid pressure of the operation fluid flowing to the fluid pressure chamber from the pressure increasing mechanism is increased.

13. The valve timing control apparatus according to claim 12, wherein the phase setting mechanism controls the fluid control valve mechanism so that the relative rotational phase corresponds to the predetermined phase in a case where the monitoring mechanism detects a signal indicating the likelihood of the decrease of the number of rotations of the internal combustion engine exceeding a control range.

14. The valve timing control apparatus according to claim 1, wherein the phase setting mechanism includes a pressure increasing valve, in a case where the pressure increasing valve is actuated, the flow area of the flow passage connected to the main fluid gallery is narrowed.

* * * * *